(12) United States Patent
Yu et al.

(10) Patent No.: US 11,449,468 B1
(45) Date of Patent: Sep. 20, 2022

(54) ENFORCING MINIMUM SPACE GUARANTEES IN THINLY-PROVISIONED FILE SYSTEMS

(71) Applicant: EMC IP Holding Company LLC, Hopkinton, MA (US)

(72) Inventors: Changyong Yu, Shanghai (CN); Xianlong Liu, Shanghai (CN); Yuetao Jiang, Shanghai (CN); Ruiling Dou, Shanghai (CN); Banghui Luo, Shanghai (CN); Walter C. Forrester, Berkeley Heights, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 928 days.

(21) Appl. No.: 15/498,834

(22) Filed: Apr. 27, 2017

(51) Int. Cl.
  *G06F 16/00* (2019.01)
  *G06F 16/17* (2019.01)
  *G06F 16/13* (2019.01)
  *G06F 16/11* (2019.01)
  *G06F 16/16* (2019.01)
  *G06F 16/178* (2019.01)
  *G06F 16/182* (2019.01)

(52) U.S. Cl.
  CPC ........ *G06F 16/1727* (2019.01); *G06F 16/128* (2019.01); *G06F 16/13* (2019.01); *G06F 16/162* (2019.01); *G06F 16/178* (2019.01); *G06F 16/1844* (2019.01)

(58) Field of Classification Search
  CPC ...... G06F 16/13; G06F 16/128; G06F 16/162; G06F 16/178; G06F 16/1727; G06F 16/1844

USPC ......................................................... 707/626
See application file for complete search history.

(56) References Cited

U.S. PATENT DOCUMENTS

| 7,467,276 | B1 * | 12/2008 | Kahn ..................... | G06F 3/0632 |
| | | | | 711/170 |
| 8,284,198 | B1 * | 10/2012 | Hackworth ........... | G06T 11/206 |
| | | | | 707/649 |
| 8,364,858 | B1 * | 1/2013 | Martin .................. | G06F 3/0607 |
| | | | | 710/36 |

(Continued)

OTHER PUBLICATIONS

EqualLogic, About thin provisioning, 2010, Dell, Version 5.0, pp. 1-5 (Year: 2010).*

(Continued)

*Primary Examiner* — Ashish Thomas
*Assistant Examiner* — Rezwanul Mahmood
(74) *Attorney, Agent, or Firm* — BainwoodHuang

(57) ABSTRACT

A technique for managing storage space includes establishing an MSR (minimum space reservation) of a thin file system built upon a storage pool. In response to a set of storage requests to the file system to store new data, the method further includes obtaining an additional space guarantee from the storage pool. After deleting data from the file system such that the size of the file system falls below the MSR, the technique further includes performing a space reclaim operation, the space reclaim operation (i) compacting the file system to a size less than the MSR, (ii) canceling the additional space guarantee such that the storage pool no longer guarantees the additional space for the file system, and (iii) continuing to reserve the full MSR of the file system, even though the size of the file system is smaller than the MSR.

19 Claims, 5 Drawing Sheets

(56) References Cited

U.S. PATENT DOCUMENTS

| | | | | |
|---|---|---|---|---|
| 8,515,904 B1* | 8/2013 | Dwyer, III | | G06F 21/6218 |
| | | | | 711/112 |
| 8,819,362 B1* | 8/2014 | Duprey | | G06F 11/2082 |
| | | | | 711/163 |
| 8,838,887 B1* | 9/2014 | Burke | | G06F 3/0689 |
| | | | | 711/112 |
| 8,898,402 B1* | 11/2014 | Stronge | | G06F 3/0605 |
| | | | | 711/100 |
| 8,959,305 B1* | 2/2015 | Lecrone | | G06F 12/023 |
| | | | | 707/813 |
| 8,976,636 B1* | 3/2015 | Martin | | G06F 3/0611 |
| | | | | 369/30.01 |
| 8,996,837 B1* | 3/2015 | Bono | | G06F 3/0665 |
| | | | | 711/170 |
| 9,092,290 B1* | 7/2015 | Bono | | G06F 8/61 |
| 9,122,697 B1* | 9/2015 | Bono | | G06F 16/13 |
| 9,122,712 B1* | 9/2015 | Bono | | G06F 16/188 |
| 9,176,681 B1* | 11/2015 | Xu | | G06F 3/0689 |
| 9,256,603 B1* | 2/2016 | Bono | | G06F 16/10 |
| 9,256,614 B1* | 2/2016 | Bono | | G06F 16/22 |
| 9,256,629 B1* | 2/2016 | Bono | | G06F 16/10 |
| 9,304,999 B1* | 4/2016 | Bono | | G06F 3/067 |
| 9,305,009 B1* | 4/2016 | Bono | | G06F 16/178 |
| 9,305,071 B1* | 4/2016 | Bono | | G06F 16/119 |
| 9,323,655 B1* | 4/2016 | Sahin | | G06F 3/061 |
| 9,329,803 B1* | 5/2016 | Bono | | G06F 3/0641 |
| 9,330,155 B1* | 5/2016 | Bono | | G06F 16/1787 |
| 9,378,219 B1* | 6/2016 | Bono | | G06F 16/1844 |
| 9,378,261 B1* | 6/2016 | Bono | | G06F 16/275 |
| 9,400,741 B1* | 7/2016 | Bono | | G06F 3/0655 |
| 9,400,792 B1* | 7/2016 | Bono | | G06F 9/5016 |
| 9,424,117 B1* | 8/2016 | Bono | | G06F 11/0751 |
| 9,477,431 B1* | 10/2016 | Chen | | G06F 3/0685 |
| 9,507,787 B1* | 11/2016 | Bono | | G06F 16/13 |
| 9,507,887 B1* | 11/2016 | Wang | | G06F 3/0647 |
| 9,524,233 B2* | 12/2016 | Venkatasubramanian | | |
| | | | | G06F 12/08 |
| 9,535,630 B1* | 1/2017 | Bono | | G06F 3/065 |
| 9,558,111 B1* | 1/2017 | Balcha | | G06F 12/0253 |
| 9,569,455 B1* | 2/2017 | Bono | | G06F 3/0689 |
| 9,594,514 B1* | 3/2017 | Bono | | G06F 3/0679 |
| 9,778,996 B1* | 10/2017 | Bono | | G06F 16/128 |
| 9,805,105 B1* | 10/2017 | Bono | | G06F 16/27 |
| 9,842,117 B1* | 12/2017 | Zhou | | G06F 16/128 |
| 9,846,544 B1* | 12/2017 | Bassov | | G06F 3/0644 |
| 9,864,753 B1* | 1/2018 | Armangau | | G06F 3/0653 |
| 9,870,366 B1* | 1/2018 | Duan | | G06F 16/1734 |
| 9,880,777 B1* | 1/2018 | Bono | | G06F 16/178 |
| 9,881,014 B1* | 1/2018 | Bono | | G06F 16/128 |
| 9,916,102 B1* | 3/2018 | Bassov | | G06F 3/0631 |
| 9,916,202 B1* | 3/2018 | Seela | | G06F 11/2074 |
| 9,916,312 B1* | 3/2018 | Haase | | G06F 3/061 |
| 9,940,331 B1* | 4/2018 | Bono | | G06F 16/128 |
| 9,965,381 B1* | 5/2018 | Sahin | | G06F 12/023 |
| 9,983,942 B1* | 5/2018 | Seela | | G06F 11/2058 |
| 10,013,217 B1* | 7/2018 | Bono | | G06F 3/0626 |
| 10,013,425 B1* | 7/2018 | Bassov | | G06F 3/0689 |
| 10,037,251 B1* | 7/2018 | Bono | | G06F 11/2097 |
| 10,048,885 B1* | 8/2018 | Bono | | G06F 3/0605 |
| 10,089,316 B1* | 10/2018 | Haase | | G06F 16/1727 |
| 10,095,425 B1* | 10/2018 | Martin | | G06F 3/0665 |
| 10,114,754 B1* | 10/2018 | Pendharkar | | G06F 12/12 |
| 10,268,693 B1* | 4/2019 | Nanda | | G06F 3/0646 |
| 10,289,690 B1* | 5/2019 | Bono | | G06F 16/184 |
| 10,346,360 B1* | 7/2019 | Basov | | G06F 16/182 |
| 10,409,496 B1* | 9/2019 | Si | | G06F 3/0608 |
| 10,409,687 B1* | 9/2019 | Bono | | G06F 11/1451 |
| 10,409,768 B2* | 9/2019 | Kuang | | G06F 16/17 |
| 10,409,776 B1* | 9/2019 | Bassov | | G06F 3/0608 |
| 10,447,524 B1* | 10/2019 | Bono | | G06F 3/0607 |
| 10,521,398 B1* | 12/2019 | Forrester | | G06F 16/13 |
| 10,592,469 B1* | 3/2020 | Bassov | | G06F 16/13 |
| 10,613,787 B2* | 4/2020 | Yu | | G06F 12/023 |
| 10,671,309 B1* | 6/2020 | Glynn | | G06F 3/0683 |
| 10,789,017 B1* | 9/2020 | Bono | | G06F 3/0644 |
| 10,838,634 B1* | 11/2020 | Bassov | | G06F 3/067 |
| 10,983,964 B1* | 4/2021 | Bono | | G06F 3/0659 |
| 11,100,050 B1* | 8/2021 | Zhang | | G06F 3/067 |
| 2005/0193023 A1* | 9/2005 | Ismail | | G06F 3/0604 |
| | | | | 348/E7.063 |
| 2005/0234824 A1* | 10/2005 | Gill | | H04L 63/105 |
| | | | | 705/50 |
| 2007/0260830 A1* | 11/2007 | Faibish | | G06F 3/061 |
| | | | | 711/162 |
| 2007/0260842 A1* | 11/2007 | Faibish | | G06F 3/0665 |
| | | | | 711/170 |
| 2008/0005468 A1* | 1/2008 | Faibish | | G06F 3/0622 |
| | | | | 711/170 |
| 2009/0218922 A1* | 9/2009 | Chinuki | | A47B 21/00 |
| | | | | 312/223.2 |
| 2009/0300023 A1* | 12/2009 | Vaghani | | G06F 3/0643 |
| | | | | 711/170 |
| 2011/0060887 A1* | 3/2011 | Thatcher | | G06F 3/064 |
| | | | | 711/E12.001 |
| 2011/0153977 A1* | 6/2011 | Root | | G06F 12/0223 |
| | | | | 711/170 |
| 2011/0283342 A1* | 11/2011 | Yamada | | G06F 21/79 |
| | | | | 726/4 |
| 2011/0296133 A1* | 12/2011 | Flynn | | G06F 3/0652 |
| | | | | 711/171 |
| 2012/0011340 A1* | 1/2012 | Flynn | | G06F 12/0623 |
| | | | | 711/E12.016 |
| 2012/0166751 A1* | 6/2012 | Matsumoto | | G06F 3/0665 |
| | | | | 711/170 |
| 2012/0239729 A1* | 9/2012 | Hefter | | G06F 9/45533 |
| | | | | 709/203 |
| 2013/0117526 A1* | 5/2013 | Florendo | | G06F 3/064 |
| | | | | 711/171 |
| 2014/0258670 A1* | 9/2014 | Venkatasubramanian | | |
| | | | | G06F 3/0683 |
| | | | | 711/171 |
| 2014/0298317 A1* | 10/2014 | Devine | | G06F 9/5077 |
| | | | | 717/174 |
| 2015/0234841 A1* | 8/2015 | Hebert | | G06F 16/2282 |
| | | | | 707/703 |
| 2017/0075708 A1* | 3/2017 | Dalal | | G06F 16/188 |
| 2017/0075779 A1* | 3/2017 | Grimaldi | | G06F 11/2082 |
| 2017/0075781 A1* | 3/2017 | Bennett, Jr. | | G06F 3/0619 |
| 2017/0090766 A1* | 3/2017 | Gong | | G06F 3/0673 |
| 2017/0177238 A1* | 6/2017 | Tati | | G06F 3/0631 |
| 2017/0228206 A1* | 8/2017 | Bungert | | G06F 3/14 |
| 2017/0316027 A1* | 11/2017 | Mondal | | G06F 16/1727 |
| 2018/0095955 A1* | 4/2018 | Kuang | | G06F 16/11 |
| 2018/0307537 A1* | 10/2018 | Chen | | G06F 9/45504 |
| 2019/0129626 A1* | 5/2019 | Armangau | | G06F 3/0619 |
| 2021/0034520 A1* | 2/2021 | Davenport | | G06F 12/0804 |

OTHER PUBLICATIONS

Eric Slack, Is All Thin Provisioning the Same, Jun. 4, 2013, StorageSwiss.com, pp. 1-5 (Year: 2013).*

"EMC CLARiiON Reserved LUN Pool Configuration Considerations; Best Practices Planning", Sep. 2010, 23 pages.

* cited by examiner

ENFORCING MINIMUM SPACE GUARANTEES IN THINLY-PROVISIONED FILE SYSTEMS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Data storage systems commonly store host-accessible file systems and designate such file systems as either thick or thin. As is known, a "thick" file system is one that has a predetermined maximum size that is fully reserved. For example, a file system designated as thick with a maximum size of 100 GB reserves the full 100 GB of storage space for its exclusive use, even if the file system only consumes a fraction of that space. In contrast, a "thin" file system is not fully reserved. Rather, a thin file system may have an initial, default size of a few gigabytes. Reserved space for a thin file system grows in response to demand for additional space, e.g., in response to write requests. If the amount of space used in a thin file system decreases, e.g., on account of file deletions, a data storage system may decrease the amount of space reserved for that file system, such that reserved space for a thin file system both grows and shrinks in response to demand.

SUMMARY

Unlike thick file systems, which have space requirements that are fully reserved and known to system administrators, thin file systems are variable in size and can thus present challenges in terms of storage planning. Thin file systems can also present challenges to hosts. For example, consider a host application that writes large amounts of data to a thin file system, such that the file system grows to accommodate the new data. Each time the thin file system receives new data that would cause it to grow beyond its currently-reserved storage space, the file system first obtains a new reservation for more storage space. The thin file system can only grow if the reservation is granted. If the file system grows considerably and then shrinks, e.g., in response to large deletes, the data storage system may reclaim previously reserved but now-unused storage space from the file system, such that the total reserved space of the file system falls to a level that more closely matches the amount of storage space actually used. If the host then sends a request to write new content to the file system that would exceed the currently reserved space, the file system requests a new reservation. But that reservation may be denied if the space is no longer available, e.g., on account of other file systems having consumed the available space. Thus, a host application may have 100 GB of reserved space one day, and then have only 10 GB of reserved space the next day. This discontinuity can be disruptive to host applications, as the applications can quickly run out of space.

In contrast with the above-described approach, which can present challenges for storage planning and can cause disruptions to host applications, an improved technique for managing storage space in a data storage system establishes an MSR (minimum space reservation) for a thin file system. The MSR defines a minimum amount of storage space that is fully reserved for the file system, such that reserved space for the file system does not fall below the level established by the MSR, even if the file system consumes less storage space than the MSR prescribes. With the MSR of a thin file system established, the file system can grow larger than the MSR, obtaining additional reservations as it grows, but it cannot shrink its reserved space to levels below the MSR, even if space below the MSR is not being used. The MSR thus sets a limit on how much a data storage system can shrink a thin file system. Enforcing this limit helps administrators with storage planning and helps to prevent host applications from running out of storage space following large deletions.

Certain embodiments are directed to a method for managing storage space in a data storage system. The method includes establishing an MSR (minimum space reservation) of a thin file system built upon a storage pool in the data storage system. In response to a set of storage requests to the file system to store new data that would cause a size of the file system to exceed the MSR, the method further includes obtaining an additional space guarantee from the storage pool to accommodate the new data. After obtaining the additional space guarantee, data are deleted from the file system such that the size of the file system falls below the MSR. The method then further includes performing a space reclaim operation, the space reclaim operation (i) compacting the file system to a size less than the MSR, (ii) canceling the additional space guarantee such that the storage pool no longer guarantees the additional space for the file system, and (iii) continuing to reserve the full MSR of the file system, even though the size of the file system is smaller than the MSR.

Other embodiments are directed to a data storage system constructed and arranged to perform a method of managing storage space, such as the method described above. Still other embodiments are directed to a computer program product. The computer program product stores instructions which, when executed by control circuitry of a data storage system, cause the data storage system to perform a method of managing storage space, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for managing storage space in a data storage system includes establishing an MSR (minimum space reservation) for a thin file system. The MSR defines a minimum amount of storage space that is fully reserved for the file system, such that reserved space for the file system does not fall below the level established by the MSR, even if the file system consumes less storage space than the MSR prescribes. Providing this limit helps administrators with storage planning and helps to prevent host applications from running out of storage space following large deletions.

Figure 1:
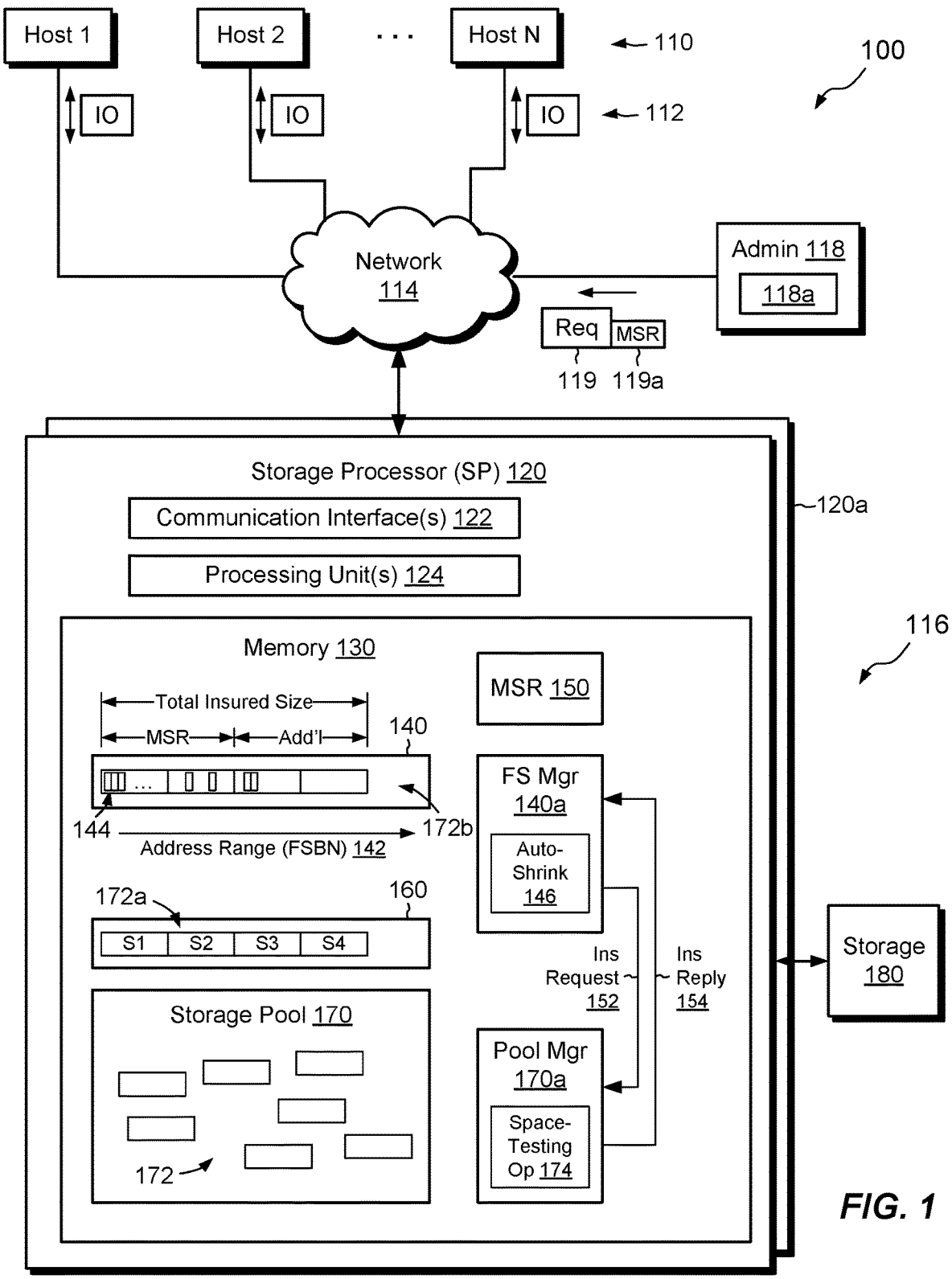
FIG. 1 is a block diagram of an example environment and data storage system in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and persistent storage 180, such as magnetic disk drives, electronic flash drives, and the like. The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood that no particular hardware configuration is required, however, as any number of SPs may be provided, including a single SP, and the SPs can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI (Internet small computer system interface), NFS (network file system), and CIFS (common internet file system), for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory, e.g., RAM (random-access memory), and non-volatile memory, such as one or more ROMs (read-only memory devices), magnetic disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a thin file system 140, a sparse volume 160, and a storage pool 170. The storage pool 170 includes slices 172 of storage extents, which are typically formed from RAID (redundant array of independent disks) groups created from disk drives in the persistent storage 180. In an example, each "slice" is an extent of contiguously addressable storage. Slices are preferably uniform in size, such as 256 MB or 1 GB, for example. As used herein, the terms "disk drive," "disk," and "drive" may be used interchangeably to refer to persistent storage devices of any kind, such as magnetic disk drives, electronic flash drives, optical drives, etc., regardless of whether such devices include any physical "disk" or employ any "drive" mechanism.

Sparse volume 160 is constructed from provisioned slices 172a, e.g., slices S1-S4, which have been provisioned to the sparse volume 160 from the storage pool 170. The sparse volume 160 supports the file system 140, with the file system 140 being laid out on the sparse volume 160.

The file system 140 has a physical address range 142, which may extend from zero to some large number. In an example, each address in the physical address range 142 is designated by a file system block number, or "FSBN," which uniquely identifies that block in the file system 140. A "block" is the smallest unit of allocatable storage space in the file system 140. Several blocks 144 are shown (not to scale). Blocks 144 typically have uniform size, such as 4 KB or 8 KB, for example. The file system 140 and the sparse volume 160 have corresponding structures. For example, each slice-sized region 172b of contiguously-addressable space in the file system 140 corresponds to a respective provisioned slice 172a in the sparse volume 160.

The memory 130 further includes a file system manager 140a and a pool manager 170a. The file system manager 140a manages operations of the file system 140, and the pool manager 170a manages operations of the storage pool 170. One should appreciate that any action described herein as being performed by the file system 140 or by the storage pool 170 generally indicates that the respective action is being performed by the file system manager 140a or by the pool manager 170a, respectively. Thus, the file system 140 and the storage pool 170 may be regarded as structures, whereas the file system manager 140a and pool manager 170a may be regarded as executable components that operate on these structures and/or on behalf of these structures.

The file system manager 140a includes an auto-shrink component 146. The auto-shrink component 146 may be run as a background process or daemon that reclaims free space from the file system 140 (and potentially from many such file systems). As will be described more fully below, the auto-shrink component 146 is configured to compact blocks 144 that are used in a file system into a smaller number of slice-sized regions 172b, such that one or more of the slice-sized regions 172b that previously contained data become free. The auto-shrink component 146 is further configured to identify provisioned slices 172a in the sparse volume 160 that correspond to the freed slice-sized regions 172b of the file system 140 and to return such provisioned slices 172a to the storage pool 170.

The pool manager 170a is configured to provision slices 172 to components requesting storage space and to reclaim slices 172 that are no longer required. The pool manager 170a also keeps track of insurance. Insurance provides a measure of space guarantees made by the storage pool 170, such as insurance granted to thick file systems to cover their maximum predetermined sizes and insurance granted to thin file systems to cover their currently-reserved sizes.

Memory 130 further includes an MSR (minimum space reservation) 150. The MSR 150 defines a lower limit of reserved storage space for the thin file system 140. The MSR 150 may be stored as a persistent data structure backed by the persistent storage 180. The MSR 150 may also have a memory-resident form. Although only a single thin file system 140 and a corresponding MSR 150 are shown, one should appreciate that the data storage system 116 may store many thin file systems and respective MSRs, e.g., one MSR for each thin file system.

In example operation, an administrator using computer 118 operates an administrative program 118a to create and specify settings of file systems in the data storage system 116. For example, the administrator or some other user may operate a GUI (graphical user interface) or a CLI (command line interface) rendered by the administrative program 118a, for entering commands and settings.

Here, the administrator operates the administrative program 118a to send a request 119 to create the thin file system 140. The request 119 includes a setting 119a for specifying a minimum space reservation (MSR) of the new, thin file system 140. The MSR specifies a minimum guaranteed amount of storage space for the thin file system 140. The storage processor (SP) 120 receives the request 119 at a communication interface 122 and initiates further processing.

In response to the request 119, file system manager 140a begins activities to create the new file system 140. For example, the file system manager 140a receives the MSR setting 119a as the value of MSR 150 and sends an insurance request 152 to the pool manager 170a. In an example, the insurance request 152 specifies an amount of storage space equal to the MSR 150. For example, if the setting 119a specified an MSR of N GB, the request 152 would specify N GB of insurance.

The pool manager 170a receives the insurance request 152 and performs a space-testing operation 174 to check for available storage space in the storage pool 170. "Available storage space" is the amount of storage space in the storage pool 170 that is not already reserved by other objects, such as other file systems. Continuing with the example above, the space testing operation 174 checks whether the storage pool 170 has N GB of available (unreserved) space. Insurance reply 154 then provides the result of the space-testing operation 174 back to the file system manager 170a. The result can arrive in the form of a confirmation, which indicates that the requested amount of space is available and has been reserved, or it can arrive in the form of a refusal, which indicates that the requested amount of space is not available. In the event of a confirmation, the file system manager 140a may continue its activities in creating the file system 140, such as by creating the sparse volume 160, creating a container for the file system 140, and formatting metadata. In the event of a refusal, the file system manager 170 may cancel its activities in creating the new file system and may send a reply to the request 119, indicating that the request 119 has failed. The administrator can then try sending another request 119, this time specifying a lower MSR setting 119a.

Once the file system 140 has been created, hosts 110 may issue IO (Input/Output) request 112 directed to the file system 140, e.g., to write new data and to read data. The file system 140 may start out with an amount of data less than the MSR, but it may eventually receive writes that cause it to grow. Once the amount of data in the file system 140 reaches the MSR, the file system 140 requires additional insurance from the storage pool 170 before it can grow any larger. In response to demand for additional storage space, the file system manager 140a issues another insurance request 152, this time seeking additional insurance to accommodate the new data. For example, the file system manager 140a may request an additional two slices 172. The pool manager 172 responds to the new request 152 by performing another space-testing operation 174, this time for reserving two new slices 172, and provides insurance reply 154. In this example, it is assumed that the new insurance request 152 is granted, and that the file system 140 is allowed to grow.

As shown by dimension lines above the file system 140, insuring the MSR 150 requires two slices (S1 and S2), while the additional insurance requires another two slices (S3 and S4). The total insured size of the file system 140 is thus four slices (the numbers of slices in this example is kept small for ease of illustration).

The file system 140 may continue to grow in this manner. It may also shrink. For example, hosts 110 may delete contents from the file system 140, creating holes (unused blocks) within slice-sized regions 172b. Auto-shrink component 146 may run in the background to compact the file system 140 in an effort to free slice-sized regions 172b, and then to return corresponding provisioned slices 172a to the storage pool 170. When slices return to the storage pool 170, the pool manager 170a cancels any additional insurance corresponding to the returned slices. However, in no event is the insurance guarantee of the MSR canceled. Rather, the data storage system continues to enforce the MSR, such that the file system 140 is guaranteed to have at least as much reserved space as the MSR prescribes.

Although the MSR is described above as a setting that accompanies a file-system creation request, an MSR setting may also accompany a request the change one or more settings of a file system that has already been created. For example, the administrator may operate program 118a to increase or decrease the MSR 150 of the file system 140 at any time. A request to increase the MSR of the file system 140 may require the file system manager 140a to send a request 152 for additional insurance, e.g., if the total insured size of the file system 140 is less than the total insurance required to support the new MSR. The request 152 may result in a success or a failure. In the case of success, the MSR 150 is updated to the new value. In the case of failure, the MSR 150 stays the same as before and the data storage system 116 may fail the administrator's request. If the total insured size exceeds the new MSR, then no new insurance request 152 is needed, as the file system 140 already has the total insurance it needs to support the change. In such cases, the SP 120 merely updates the MSR 150 to reflect the new value, which the data storage system 116 enforces going forward.

One consequence of this arrangement is that an administrator can generally change the MSR of the file system 140 to any value that does not exceed the file system's current size, i.e., the amount of storage space actually used to store the file system's data and metadata. Thus, for example, the administrator can simply change the MSR of the file system 140 to the current size (or something smaller) without concern that the change will fail.

Figure 2A:
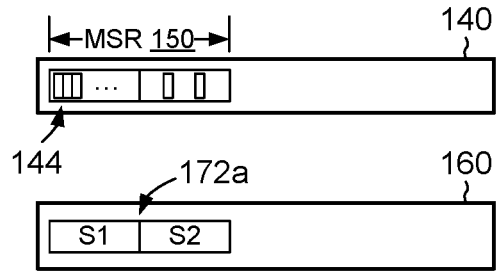
FIGS. 2a-2d are a sequence of block diagrams showing a thin file system growing, shrinking, and being compacted by a file system shrink procedure.

FIGS. 2a-2d show an example sequence of activities that demonstrates how the data storage system 116 may enforce the MSR 150 of the file system 140. As shown in FIG. 2a, the file system 140 is backed by two slices, S1 and S2, which store all of the data and metadata of the file system 140. The file system 140 has reserved all of the storage space provided by slices S1 and S2, as the sum of their sizes equals the MSR 150. It is noted that the storage space of both slices would still be reserved even if all the data and metadata of the file system 140 were able to fit within a single slice, as the MSR 150 defines a minimum reservation of the file system 140.

Figure 2B:
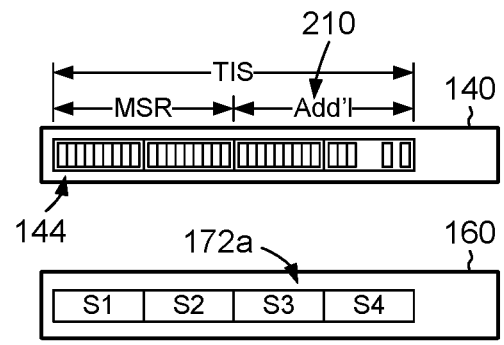

As shown in FIG. 2b, the file system 140 has grown to accommodate new writes. Four slices S1-S4 now back the file system 140. In order to have grown, the file system 140 was required to obtain additional insurance 210 from the storage pool 170, using the process described above.

Figure 2C:
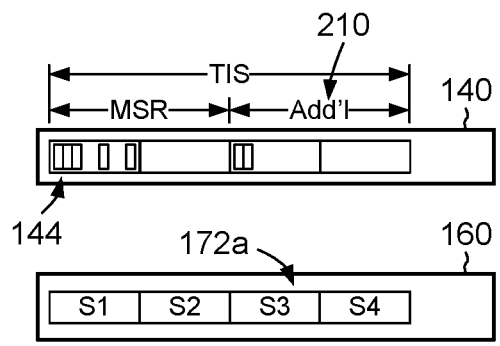

In FIG. 2c, contents have been deleted from the file system 140, which is now full of holes. For example, a host 110 may have deleted files and directories, such that the size of the file system 140, in terms of actual blocks used, is much smaller than it was prior to the deletions.

Figure 2D:
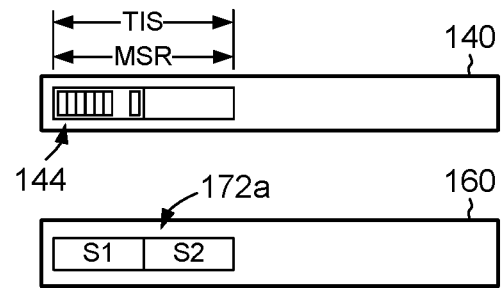

FIG. 2d shows an example arrangement after the auto-shrink component 146 has been run. As shown, the auto-shrink component has compacted the contents of the file system 140, which now fit within a single slice, S1. The auto-shrink component 146 has also canceled the reservation for the additional storage 210 and has returned slices S3 and S4 to the storage pool 170. However, reserved space for slices S1 and S2 still remains, as that space is required to maintain the MSR 150. Thus, the auto-shrink component 146 is able to reclaim the additional insurance 210, but not the MSR 150.

After the auto-shrink component 146 has run, a host 110 may access the file system 140 and detect that the file system 140 is much smaller than it was before (as in FIG. 2b). But the file system 140 still has considerable reserved space, as established by MSR 150, which is available to the host 110 for storing new content.

Enforcing the MSR 150 thus has the effect of limiting the amount of reserved storage space that the auto-shrink component 146 can reclaim from the file system 140. Although users may see sudden reductions in reserved space as a result of auto-shrink, they can rest assured that the file system 140 will always be left with at least a minimum known quantity of reserved space, which users can control and rely upon going forward.

Figure 3:
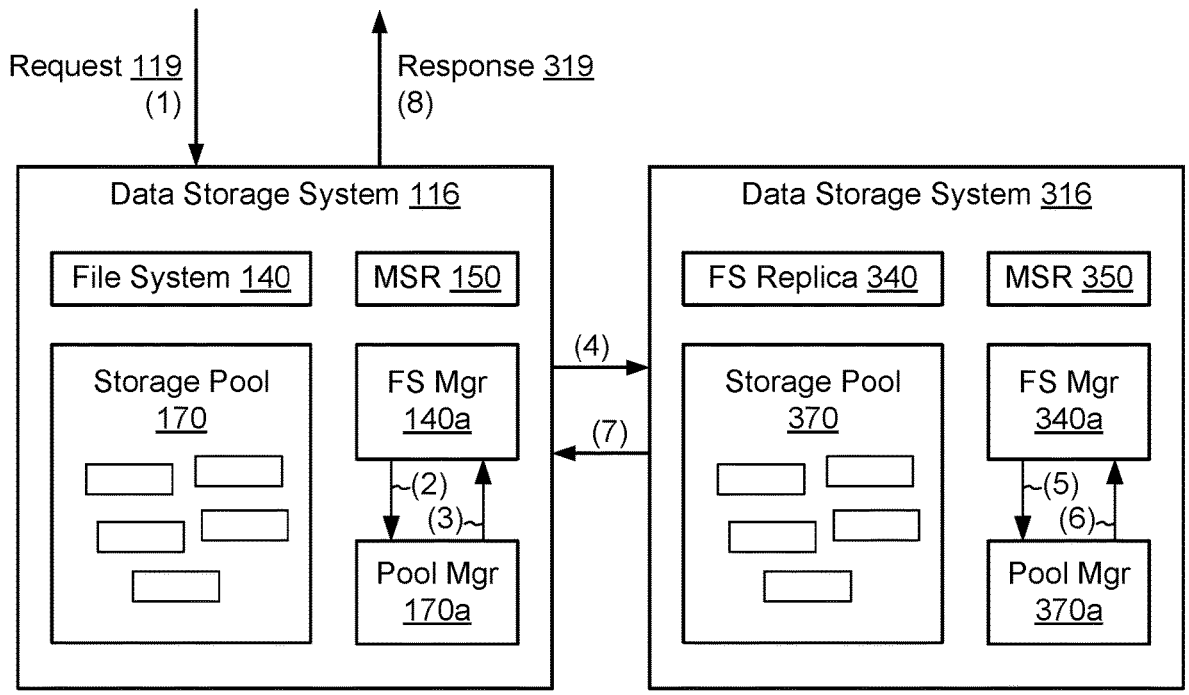
FIG. 3 is a block diagram showing an example arrangement for responding to a request to establish or increase minimum guaranteed space (MGS) for a thin file system undergoing replication.

FIG. 3 shows an example arrangement in which the data storage system 116 performs replication with a second data storage system 316. Here, a replication session is configured to maintain a replica 340 of the file system 140 on the second data storage system 316. The second data storage system 316 is configured similarly to the data storage system 116, i.e., it includes a file system manager 340a, a storage pool 370, and a pool manager 370a, which are operationally similar to the file system manager 140a, storage pool 170, and pool manager 170a, respectively, as described above. The replica 340 has an associated MSR 350. Replication proceeds by duplicating changes made to the file system 140 in the replica 340, such that the replica 340 tracks the file system 140 in real time, or nearly so.

When the file system 140 is subject to replication, as in FIG. 3, it is possible that space guarantees for the file system 140 may not be fully supported by the replica 340. In such cases, the second data storage system 316 may run out of space for keeping the replica 340 current with the file system 140 and replication will fail.

To avoid such failures, the data storage systems 116 and 316 coordinate to ensure that the MSR 350 of the replica 340 in the data storage system 316 is at least as large as the MSR 150 of the file system 140 in the data storage system 116. In the figure, numerals shown in parentheses indicate an example sequence of operations for ensuring that MSR 350 is at least as large as MSR 150.

At (1), the data storage system 116 receives a request 119 to establish (or change) the MSR of the file system 140. This request is similar to the one described in connection with FIG. 1. At (2), the file system manager 140a sends an insurance request 152 (FIG. 1) to the pool manager 170a, requesting enough insurance to cover the full MSR as received in the request 119. The pool manager 170a performs a space-testing operation 174. If the space-testing operation 174 succeeds, then at (3) the pool manager 170a sends a successful result 154 back to the file system manager 140a.

At (4), the data storage system 116 sends a request to the second data storage system 316. The request at (4) may be similar to the request 119, in that it specifies a requested MSR. In this case, the request is to establish a value of the MSR 350. At (5), in the second data storage system 316, the file system manager 340a sends an insurance request (like 152) to the pool manager 370a, requesting enough insurance to cover the full MSR as received in the request 119. The pool manager 370a performs a space-testing operation (like 174). If the space-testing operation 174 succeeds, then at (6) the pool manager 370a sends a successful reply (like 154) back to the file system manager 340a.

At (7), the second data storage system 316 confirms that it was able to establish the requested MSR for the replica 340. As both data storage systems 116 and 316 can provide the requested MSR, a response 319 at (8) acknowledges that the request 119 has been granted. One should appreciate that granting the request 119 to establish or update the MSR 150 of the file system 140 is contingent upon both (1) the storage pool 170 being able to insure the MSR 150 and (2) the storage pool 370 being able to insure the same MSR 150. Failure of either storage pool to insure the full MSR 150 may result in a failure of the request 119, such that the response 319 provides a failing result.

Although the sequence depicted in FIG. 3 performs the space-testing operation 174 in the data storage system 116 prior to performing a similar operation in the second data storage system 316, the order of testing may be reversed. For example, the sequence may first test that the storage pool 370 in the second data storage system 316 can cover the requested MSR before testing whether the storage pool 170 in the data storage system 116 can cover the requested MSR, as well.

Figure 4A:
FIGS. 4a-4c are block diagrams showing an example sequence for managing minimum guaranteed space of a thin file system when taking a snap of the file system, changing the minimum guaranteed space for the file system, and then recovering from the snap.
Figure 4B:
Figure 4C:

FIGS. 4a-4c show an example arrangement for enforcing the MSR 150 of the file system 140, when taking a snap of the file system 140 and then restoring from the snap.

As is known, a "snap" is a point-in-time version of a data object, which provides a checkpoint from which a data storage system can recover in the event of a failure or problem with a production version of the data object, or for any reason. In an example, the data storage system 116 may have a policy of creating a new snap of the file system 140 once per day. If a user accesses the file system 140 one morning and opens a file that contains a computer virus, which attacks and corrupts other files in the file system 140, the administrator can operate the administrative program 118a to restore from the most recent snap, which then becomes the new production version of the file system 140. As the snap was created prior to the attack, the snap provides a safe point from which to restore and resume operations.

FIG. 4a shows an example snap 440, which was created as a point-in-time version of the file system 140. At the time the snap was taken, the file system 140 had an MSR 150 equal to MSR1. Thus, the snap 440, which is initially identical to the file system 140, also has an MSR equal to MSR1. In some examples, the snap 440 is itself not reserved to the full extent of MSR1, as fully reserving snaps is generally redundant and would quickly consume all available storage space. Rather, the data storage system 116 saves MSR1 in connection with snap 440 in the event that the snap 440 is needed for recovery.

As shown in FIG. 4b, the file system 140 has changed since snap 440 was taken. For example, hosts 110 may have written large amounts of data to file system 140, such that additional insurance was needed. The MSR 150 of the file system 140 is now equal to MSR2, which may be greater than MSR1.

As shown in FIG. 4c, file system 140 goes out of service. For example, the file system 140 may contract a virus or may merely become obsolete, such that the administrator restores from the snap 440, thus making snap 440 the new production file system. Here, however, the MSR 150 of the new production file system is MSR1, i.e., the MSR of the file system 140 at the time the snap 440 was taken. MSR2 is no longer relevant. Once the snap 440 is restored, the data storage system 116 fully enforces MSR1 for the restored snap. Storage space corresponding to a difference between MSR1 and MSR2 may be returned to the storage pool 170.

Figure 5:
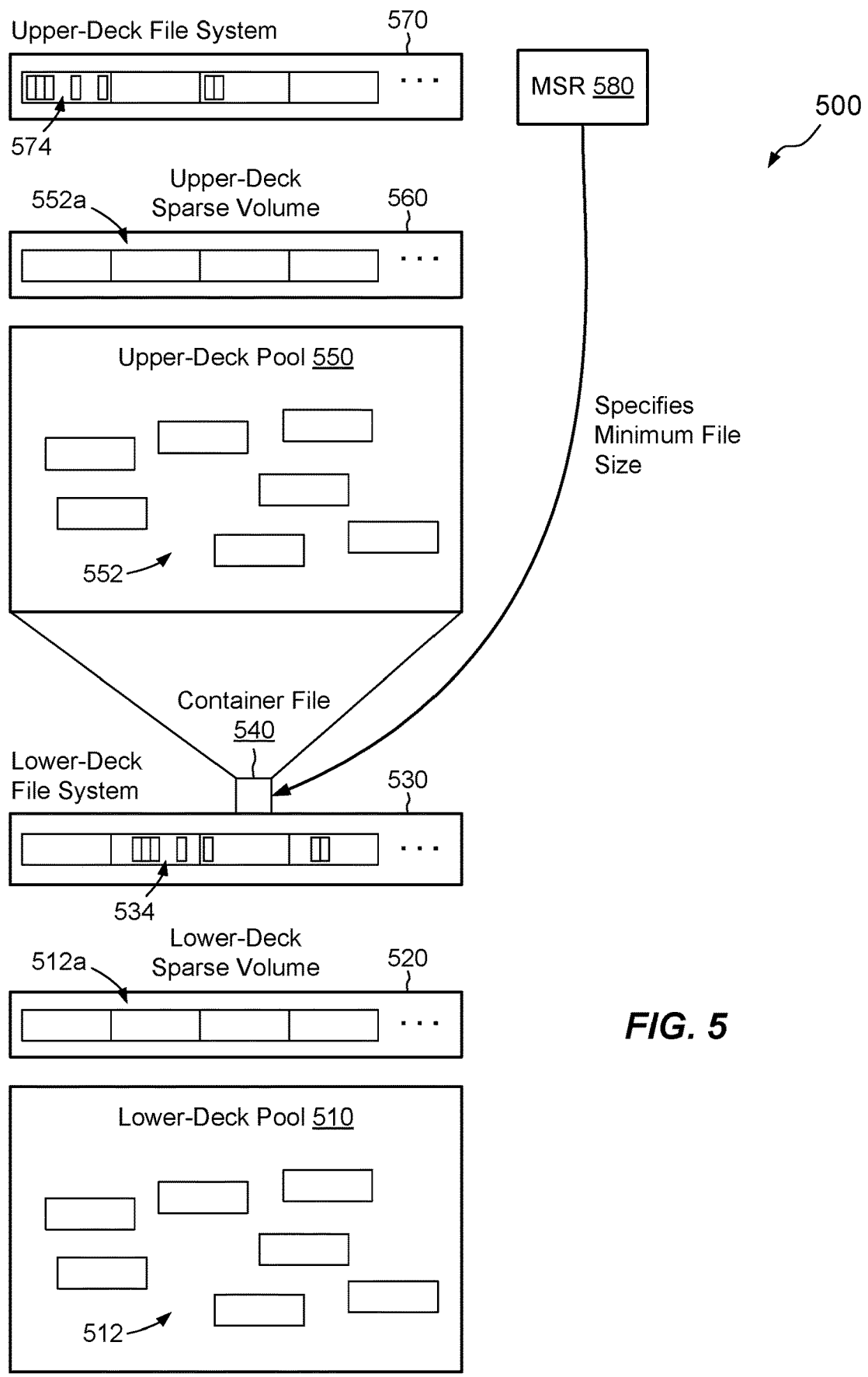
FIG. 5 is a block diagram of an example arrangement of storage constructs in the data storage system of FIG. 1.

FIG. 5 shows an example arrangement of storage constructs in the SP 120 of the data storage system 116. In the particular example shown, a host-accessible file system 570 is realized within a single file 540, which itself belongs to a file system 530. Here, the host-accessible file system 570 is referred to as an "upper-deck file system" and the file system 530 is referred to as a "lower-deck file system."

The lower-deck file system 530 is laid out on a lower-deck sparse volume 520, which includes provisioned slices 512a populated from a lower-deck pool 510. The lower-deck pool 510 contains slices 512, which may be formed from RAID groups. Thus, the arrangement of lower-deck structures 510, 520, and 530 are analogous to structures 170, 160, and 140, respectively, in FIG. 1.

In a similar manner, the upper-deck file system 570 is laid out on an upper-deck sparse volume 560, which includes provisioned slices 552a populated from an upper-deck pool 550. The upper-deck pool 550 contains slices 552. Here, the slices 552 are formed by expressing the file 540 as a volume and carving the volume into slices 552.

It can be seen that the arrangement of FIG. 5 is similar to the arrangement of FIG. 1, but multiplied by two and stacked vertically. The arrangement of FIG. 5 has the advantage of realizing the entire upper-deck file system 570 as single file 540. The file 540 may be referred to herein as a "container file" as it contains the entire upper-deck file system 570, including all of its data and metadata. Blocks 574 of the upper-deck file system 570 translate to corresponding blocks in the container file 540, and thus to blocks 534 in the lower-deck file system 530.

Owing to the mapping relationship between the upper-deck file system 570 and the container file 540, the size of the upper-deck file system 570 is merely the file size of the container file 540. The process for reserving space in the upper-deck file system 570 therefore translates to a process for reserving space for the container file 540. A request to establish an MSR 150 of the upper-deck file system 570 may thus be satisfied by insuring the container file 540 in the lower-deck pool 510 to the same extent as the MSR.

For example, assume that a request 119 (FIG. 1) includes a setting 119a to establish an MSR of 50 GB for the file system 570 (the upper-deck file system). According to the arrangement of FIG. 5, the SP 120 translates this request 119 to a request to guarantee 50 GB of storage space for the container file 540. A space-testing operation (like 174) is performed by a manager of storage pool 510, which either guarantees the space or does not. Assuming the space is guaranteed, the data storage system 116 protects the MSR of the container file 540, blocking auto-shrink operations from reducing the reserved space of container file 540 below the MSR.

Figure 6:
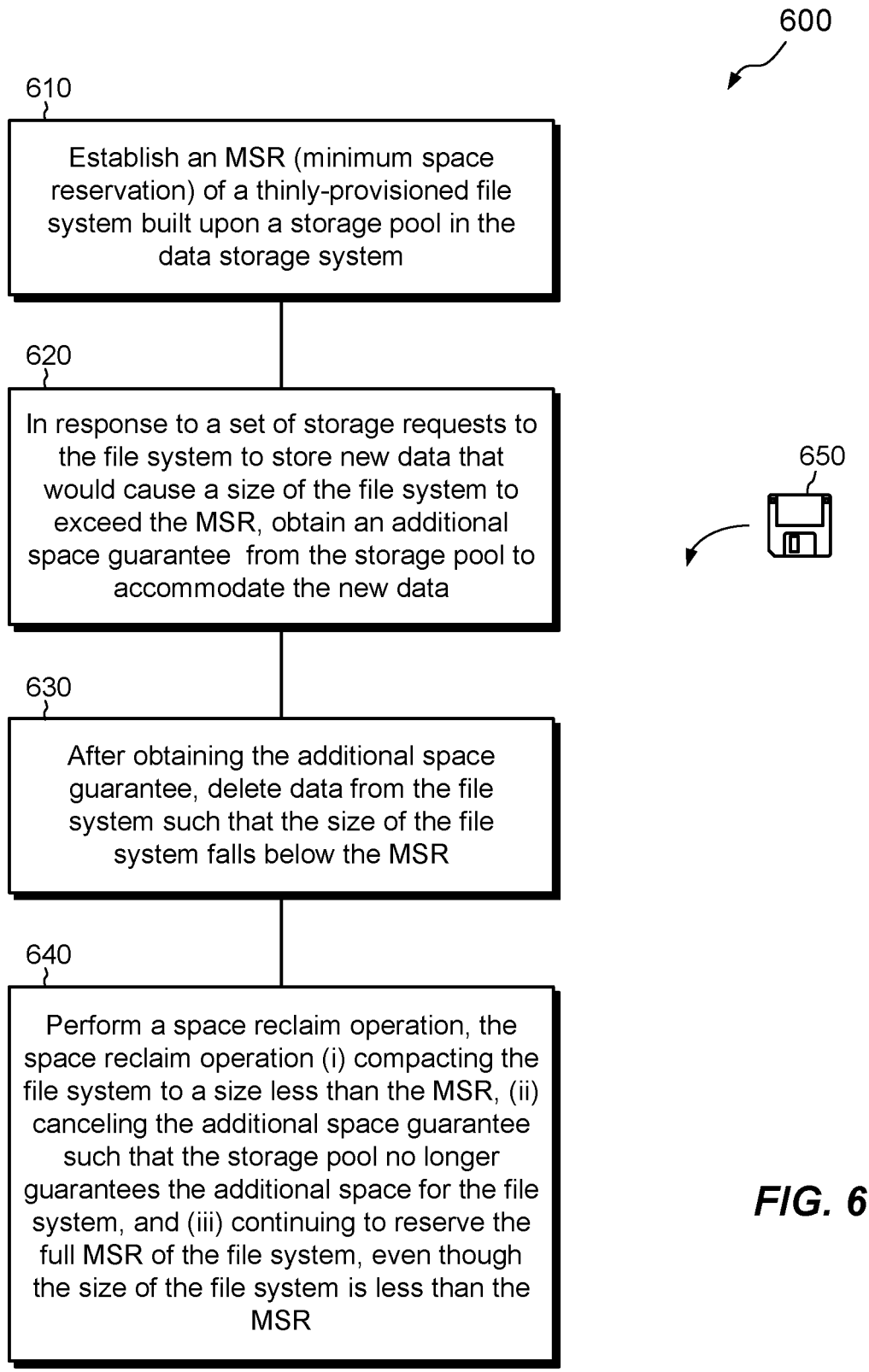
FIG. 6 is a flowchart showing an example method of storing data in the data storage system of FIG. 1.

FIG. 6 shows an example method 600 that may be carried out in connection with the environment 100 and provides a summary of example features described above. The method 600 is typically performed, for example, by the software constructs described in connection with FIG. 1, which reside in the memory 130 of the storage processor 120 and are run by the set of processing units 124. The various acts of the method 600 may be ordered in any suitable way. Accordingly, embodiments may be constructed in which acts are performed in orders different from that illustrated, which may include performing some acts simultaneously.

At 610, an MSR (minimum space reservation) 150 is established for a thin file system 140 built upon a storage pool 170 in the data storage system 116. The MSR 150 may be established, for example, in response to a request 119 from an administrative program 118a to create the file system 140 or to change any of its settings.

At 620, in response to a set of storage requests 112 to the file system 140 to store new data that would cause a size of the file system 140 to exceed the MSR 150, an additional space guarantee 210 is obtained from the storage pool 170 to accommodate the new data. For example, writes directed to the file system 140 may cause the file system 140 to grow, triggering the file system manager 140a to send one or more insurance requests 152 to the pool manager 170a.

At 630, after obtaining the additional space guarantee 210, data from the file system 140 are deleted such that the size of the file system 140 falls below the MSR 150.

At 640, a space reclaim operation (e.g., auto-shrink 146) is performed. The space reclaim operation 146 includes (i)

compacting the file system 146 to a size less than the MSR 150, (ii) canceling the additional space guarantee 210 such that the storage pool 170 no longer guarantees the additional space for the file system 140, and (iii) continuing to reserve the full MSR 150 of the file system 140, even though the size of the file system 140 is smaller than the MSR 150.

An improved technique has been described for managing storage space in a data storage system 116. The technique includes establishing an MSR (minimum space reservation) 150 for a thin file system 140. The MSR 150 defines a minimum amount of storage space that is fully reserved for the file system 140, such that reserved space for the file system does not fall below the level established by the MSR 150, even if the file system 140 consumes less storage space than the MSR 150 prescribes. Providing this limit helps administrators with storage planning and helps to prevent host applications from running out of storage space following large deletions.

Having described certain embodiments, numerous alternative embodiments or variations can be made. For example, although particular arrangements of storage constructs are shown and described, such as sparse volumes, slices, and the like, these are shown by way of example and should not be construed as limiting.

Also, while the auto-shrink component 146 is described as a background process or daemon for reclaiming storage space, this is merely an example, as other methods for reclaiming unused storage space may be employed. One alternative would be to perform inline reclamation, which would respond directly to requests to delete contents by consolidating space.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing storage space in a data storage system, the method comprising:

establishing an MSR (minimum space reservation) of a thin file system built upon a storage pool of non-volatile storage in the data storage system, the MSR defining, contrary to a typical nature of thin file systems, a minimum reservation of non-volatile storage space from the storage pool;

in response to a set of storage requests to the file system to store new data that would cause a size of the file system to exceed the MSR, obtaining an additional space guarantee from the storage pool to accommodate the new data;

after obtaining the additional space guarantee, deleting data from the file system such that the size of the file system falls below the MSR; and performing a space reclaim operation, the space reclaim operation (i) compacting the file system to reduce its size in response to deleting the data to a size less than the MSR, (ii) canceling the additional space guarantee such that the storage pool no longer guarantees the additional space for the file system, and (iii) continuing to reserve the established MSR of the file system, even though the size of the file system is smaller than the MSR due to deleting the data, wherein the file system is an upper-deck file system built upon a single container file in a lower-deck the system, and wherein establishing the MSR of the file system includes specifying a minimum file size for the single container file in the lower-deck file system equal to the MSR.

2. The method of claim 1, wherein establishing the MSR of the file system is performed in response to a request from an administrative program to create the file system, the request to create the file system including a setting for establishing the MSR of the file system.

3. The method of claim 1, wherein establishing the MSR of the file system is performed in response to a request from an administrative program to change an MSR setting of the file system after the file system is initially created.

4. The method of claim 1, further comprising, prior to establishing the MSR of the file system, receiving, by a manager of the storage pool, a request to establish the MSR of the file system, wherein establishing the MSR of the file system includes:

performing a space-testing operation configured to (i) produce a first result in response to the storage pool having sufficient free space to accommodate the MSR and (ii) produce a second result otherwise, wherein establishing the MSR of the file system is contingent upon the space-testing operation producing the first result.

5. The method of claim 4, wherein the data storage system performs replication on the file system to maintain a replica of the file system on a second data storage system, wherein the replica of the file system is built upon a second storage pool in the second data storage system, and wherein establishing the MSR of the file system further includes:

performing a second space-testing operation on the second data storage system, the second space-testing operation configured to generate (i) a third result in response to the second storage pool having sufficient free space to accommodate the MSR of the file system and (ii) a fourth result otherwise, wherein establishing the MSR of the file system is further contingent upon the second space-testing operation producing the third result.

6. The method of claim 4, further comprising:

while the MSR of the file system has a first value, taking a snap of the file system;

after taking the snap, increasing the MSR to a second value greater than the first value; and restoring the file system from the snap, including reestablishing the first value of the MSR as the MSR of the file system as restored from the snap.

7. The method of claim 4, further comprising storing the MSR of the file system in a persistent data structure within the data storage system.

8. The method of claim 7, wherein the file system has a current size of data in use that exceeds the MSR of the file system, and wherein the method further comprises:

receiving a request to increase the MSR of the file system to a value that does not exceed the current size of data in use by the file system; and in response to receiving the request to increase the MSR, increasing the MSR without requesting any additional space guarantees from the storage pool.

9. The method of claim 1, further comprising:

generating multiple snaps of the thin file system at respective points in time;

storing, in connection with each of the multiple snaps, a respective MSR of the thin file system as of the time the respective snap was generated;

updating the MSR of the thin file system after a particular snap of the multiple snaps has been generated; and upon restoring the thin file system from the particular snap, modifying the MSR of the thin file system to match the MSR of the thin file system as of the time the particular snap was generated.

10. A data storage system, comprising control circuitry that includes a set of processing units coupled to memory, the control circuitry constructed and arranged to:

establish an MSR (minimum space reservation) of a thin file system built upon a storage pool of non-volatile storage in the data storage system, the MSR defining, contrary to a typical nature of thin file systems, a minimum reservation of non-volatile storage space;

in response to a set of storage requests to the file system to store new data that would cause a size of the file system to exceed the MSR, obtain an additional space guarantee from the storage pool to accommodate the new data;

after obtaining the additional space guarantee, delete data from the file system such that the size of the file system falls below the MSR; and perform a space reclaim operation, the space reclaim operation configured to (i) compact the file system to reduce its size in response to deletion of the data to a size less than the MSR, (ii) cancel the additional space guarantee such that the storage pool no longer guarantees the additional space for the file system, and (iii) continue to reserve the established MSR of the file system due to deletion of the data, wherein the file system is an upper-deck file system built upon a single container file in a lower-deck file system, and wherein the control circuitry constructed and arranged to establish the MSR of the file system is further constructed and arranged to specify a minimum file size for the single container file in the lower-deck file system equal to the MSR.

11. The data storage system of claim 10, wherein the control circuitry is constructed and arranged to establish the MSR of the file system in response to a request from an administrative program to create the file system, the request to create the file system including a setting for establishing the MSR of the file system.

12. A computer program product including a set of non-transitory, computer-readable media having instructions which, when executed by control circuitry of a data storage system, cause the control circuitry to perform a method of managing storage space, the method comprising:

establishing an MSR (minimum space reservation) of a thin file system built upon a storage pool of non-volatile storage in the data storage system, the MSR defining, contrary to a typical nature of thin file systems, a minimum reservation of non-volatile storage space;

in response to a set of storage requests to the file system to store new data that would cause a size of the file system to exceed the MSR, obtaining an additional space guarantee from the storage pool to accommodate the new data;

after obtaining the additional space guarantee, deleting data from the file system such that the size of the file system falls below the MSR; and performing a space reclaim operation, the space reclaim operation (i) compacting the file system to reduce its size in response to deleting the data to a size less than the MSR, (ii) canceling the additional space guarantee such that the storage pool no longer guarantees the additional space for the file system, and (iii) continuing to reserve the established MSR of the file system, even though the size of the file system is smaller than the MSR due to deleting the data, wherein the file system is an upper-deck file system built upon a single container file in a lower-deck file system, and wherein establishing the MSR of the file system includes specifying a minimum file size for the single container file in the lower-deck the system equal to the MSR.

13. The computer program product of claim 12, wherein establishing the MSR of the file system is performed in response to a request from an administrative program to create the file system, the request to create the file system including a setting for establishing the MSR of the file system.

14. The computer program product of claim 12, wherein establishing the MSR of the file system is performed in response to a request from an administrative program to change an MSR setting of the file system after the file system is initially created.

15. The computer program product of claim 12, further comprising, prior to establishing the MSR of the file system, receiving, by a manager of the storage pool, a request to establish the MSR of the file system, wherein establishing the MSR of the file system includes:

performing a space-testing operation configured to (i) produce a first result in response to the storage pool having sufficient free space to accommodate the MSR and (ii) produce a second result otherwise, wherein establishing the MSR of the file system is contingent upon the space-testing operation producing the first result.

16. The computer program product of claim 15, wherein the data storage system performs replication on the file system to maintain a replica of the file system on a second data storage system, wherein the replica of the file system is built upon a second storage pool in the second data storage system, and wherein establishing the MSR of the file system further includes:

performing a second space-testing operation on the second data storage system, the second space-testing operation configured to generate (i) a third result in response to the second storage pool having sufficient free space to accommodate the MSR of the file system and (ii) a fourth result otherwise, wherein establishing the MSR of the file system is further contingent upon the second space-testing operation producing the third result.

17. The method of claim 15, wherein the method further comprises:

while the MSR of the file system has a first value, taking a snap of the file system;

after taking the snap, increasing the MSR to a second value greater than the first value; and restoring the file system from the snap, including reestablishing the first value of the MSR as the MSR of the file system as restored from the snap.

18. The computer program product of claim 15, wherein the method further comprises storing the MSR of the file system in a persistent data structure within the data storage system.

19. The computer program product of claim 18, wherein the file system has a current size of data in use that exceeds the MSR of the file system, and wherein the method further comprises:

receiving a request to increase the MSR of the file system to a value that does not exceed the current size of data in use by the file system; and in response to receiving the request to increase the MSR, increasing the MSR without requesting any additional space guarantees from the storage pool.

\* \* \* \* \*